(12) United States Patent
Daum et al.

(10) Patent No.: US 9,849,419 B2
(45) Date of Patent: Dec. 26, 2017

(54) PROCESS AND PLANT FOR THE PRODUCTION OF LIQUID ACID

(71) Applicant: OUTOTEC (FINLAND) OY, Espoo (FI)

(72) Inventors: Karl-Heinz Daum, Limburg (DE); Hannes Storch, Friedrichsdorf (DE); Wolfram Schalk, Bad Homburg (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/308,720

(22) PCT Filed: May 9, 2014

(86) PCT No.: PCT/EP2014/059574
§ 371 (c)(1),
(2) Date: Nov. 3, 2016

(87) PCT Pub. No.: WO2015/169395
PCT Pub. Date: Nov. 12, 2015

(65) Prior Publication Data
US 2017/0182457 A1    Jun. 29, 2017

(51) Int. Cl.
| | |
|---|---|
| *B01D 53/14* | (2006.01) |
| *B01D 53/18* | (2006.01) |
| *B01D 53/50* | (2006.01) |
| *B01D 53/78* | (2006.01) |
| *C01B 17/80* | (2006.01) |
| *C01B 17/88* | (2006.01) |

(52) U.S. Cl.
CPC ....... *B01D 53/507* (2013.01); *B01D 53/1481* (2013.01); *B01D 53/18* (2013.01);
(Continued)

(58) Field of Classification Search
CPC ............ B01D 53/507; B01D 2251/506; B01D 53/1481; B01D 53/18; B01D 53/50;
(Continued)

(56) References Cited

U.S. PATENT DOCUMENTS 1,608,006 A * 11/1926 Shapleigh ............. C01B 17/806
422/160
3,172,725 A    3/1965 Rugh
(Continued)

FOREIGN PATENT DOCUMENTS

| | | |
|---|---|---|
| DE | 1 667 692 A1 | 4/1972 |
| DE | 34 10 109 A1 | 10/1985 |

(Continued)

OTHER PUBLICATIONS

International Search Report (PCT/ISA/210) dated Jan. 21, 2015, by the European Patent Office as the International Searching Authority for International Application No. PCT/EP2014/059574.
(Continued)

*Primary Examiner* — Timothy Vanoy
(74) *Attorney, Agent, or Firm* — Buchanan, Ingersoll & Rooney PC

(57) ABSTRACT

A process for the production of liquid acid, comprising the steps of: feeding liquid acid with a first concentration into a gas purification; passing a gas through the gas purification such that a second concentration of the liquid acid is reached; withdrawing the liquid acid from the sump of the gas purification, where in the gas purification sump is divided by a partition wall into a first and a second section. The concentration of the liquid acid collected in the first section is adjusted to the first concentration. The liquid acid with the first concentration from the first section is at least partially fed back into step and the liquid acid with the second concentration collected in the second section is at least partially withdrawn as product.

11 Claims, 6 Drawing Sheets

(52) U.S. Cl.
CPC ............ *C01B 17/806* (2013.01); *C01B 17/88* (2013.01); *B01D 2251/506* (2013.01)

(58) Field of Classification Search
CPC ...... B01D 53/14; B01D 53/78; C01B 17/806; C01B 17/88
See application file for complete search history.

(56) References Cited

U.S. PATENT DOCUMENTS

| | | |
|---|---|---|
| 4,533,522 A | 8/1985 | Leimkühler |
| 4,670,224 A | 6/1987 | Stehning et al. |

FOREIGN PATENT DOCUMENTS

| | | |
|---|---|---|
| EP | 0 151 010 A2 | 8/1985 |
| GB | 1 288 835 A | 9/1972 |

OTHER PUBLICATIONS

Written Opinion of the International Searching Authority (PCT/ISA/237) dated Jan. 21, 2015, by the European Patent Office as the International Searching Authority for International Application No. PCT/EP2014/059574.

Written Opinion of the International Preliminary Examining Authority (PCT Rule 66) (Form PCT/IPEA/408) dated May 24, 2016, by the European Patent Office as the International Searching Authority for International Application No. PCT/EP2014/059574.

Notification of Transmittal of the International Preliminary Report on Patentability (Form PCT/IPEA/416) and International Preliminary Report on Patentability (Form PCT/IPEA/409) dated Aug. 26, 2016, by the European Patent Office for International Application No. PCT/EP2014/059574.

Louie: "Handbook of Sulphuric Acid Manufacturing", Second Edition, DKL Engineering, Inc., Richmond Hill, Aurora, Ontario, Canada, 2008, p. 19-7.

\* cited by examiner

PROCESS AND PLANT FOR THE PRODUCTION OF LIQUID ACID

The present invention relates to a process for the production of liquid acid, in particular sulfuric acid or oleum, as well as plants for carrying out these processes.

Pure sulfuric acid ($H_2SO_4$) is a colorless, translucent, corrosive and hygroscopic liquid with oil-like consistency. It is one of the most important basic chemicals and is used in a variety of technical areas, including in the production of fertilizers, for the production of other mineral acids, as oxidizing agent and as dissolving agent for numerous ores. The concentration of commercially available liquid $H_2SO_4$ varies with the intended use; usual concentrations are in the range of 35 wt-% $H_2SO_4$ (battery acid), 75 wt-% $H_2SO_4$ and 100 wt-% $H_2SO_4$.

Fuming sulfuric acid (oleum, $H_2S_2O_7$) is a solution of sulfur trioxide ($SO_3$) in sulfuric acid. It is used, inter alia, as intermediate for the transport of sulfuric acid and sulfuric acid-containing compounds, as a reactive agent in organic chemistry as well as in the manufacture of explosives. The $SO_3$ concentration of commercially available oleum varies with the intended use; usual concentrations are in the range of 25 wt-% $SO_3$, 30-35 wt-% $SO_3$ and 65 wt-% $SO_3$.

Various methods for the preparation of sulfuric acid or oleum are known, such as the lead chamber and the vitriol process. Due to various procedural disadvantages, sulfuric acid or oleum is today almost exclusively produced in the so-called contact process. For oleum, this process is described e.g. by Douglas K. Louie, "Handbook of Sulphuric Acid Manufacturing", 2nd edition, DKL Engineering, Inc., Richmond Hill, Ontario, Canada, 2008, page 19-7.

The contact process is inter alia characterized in that liquid sulfuric acid or liquid oleum of a certain concentration is transferred to an absorber where contact with a gas containing $SO_3$ occurs and causes an increase in the concentration of said sulfuric acid or of oleum. In the case of sulfuric acid, an exothermic reaction of the $SO_3$ with the water bound by the sulfuric acid will occur according to the reaction equation:

$$SO_3 + H_2O \rightarrow H_2SO_4$$

In the case of oleum, an exothermic reaction of the sulfuric acid with $SO_3$ takes place according to the reaction equation:

$$SO_3 + H_2SO_4 \rightarrow H_2S_2O_7$$

The concentrated acid/concentrated oleum is typically removed after the $SO_3$ absorption and diluted sufficiently such that a part of the acid/the oleum can be recirculated to the absorber while the other part is taken out as the final product.

The required $SO_3$ may be produced by a reaction of $SO_2$ over a $V_2O_5$-catalyst, which is typically promoted by $K_2SO_4$. $SO_2$ can be obtained by combustion of elemental sulfur in dried oxygen containing gas, such as dried air.

To generate the required amount of dried oxygen containing gas for the combustion of elemental sulfur, the hygroscopic properties of sulfuric acid can be utilized. However, in principle other hygroscopic liquid acids can be used, e.g. phosphoric acid. The water containing gas is conducted inside a drying tower, wherein the moisture from said gas is absorbed by the acid. As a result of this absorption, the acid concentration will be decreased inside the drying tower. However, in order to ensure a sufficient drying, the sulfuric acid concentration has to be maintained at a certain minimum concentration.

This raises the problem that in some applications the desired sulfuric acid/oleum concentration in the final product is different from what is required for the reaction in the absorber or for the water removal in the drying tower, so that a uniform dilution or concentration and subsequent division of the product formed in the absorber or in the drying tower as described above is not possible. For example, the sulfuric acid which is fed into the absorber has a concentration of about 98.5 wt-%, the sulfuric acid withdrawn from the absorber has a concentration of typically about 99.4 wt-% while the desired concentration in the final product is in some cases about 99.1-99.2 wt-%. Likewise, the sulfuric acid which is fed into the drying tower may have to exhibit a concentration of more than about 94 wt-%, while the desired concentration in the final product may be about 93 wt-%.

In the prior art, this problem has hitherto been solved for example by using a separate absorber or a separate drying tower for the preparation of sulfuric acid/oleum of the desired concentration. This is technically elaborate and incurs additional costs in terms of energy and material use.

It is the object of the present invention to provide a method and a system that overcomes the disadvantages of the prior art described above.

This technical problem is surprisingly solved by a process and a plant for producing liquid acid in accordance with claims 1 and 7, respectively.

Preferred embodiments of the invention are evident from the dependent claims.

The invention provides a process for the production of liquid acid, comprising the steps of:
(i) feeding liquid acid with a first concentration into a gas purification;
(ii) passing a gas through the gas purification such that a second concentration of the liquid acid is reached;
(iii) withdrawing the liquid acid from the sump of the gas purification,
characterized in
that the gas purification sump is divided by a partition wall into a first and a second section,
that the concentration of the liquid acid collected in the first section is adjusted to the first concentration,
that the liquid acid with the first concentration from the first section is at least partially fed back into step (i), and
that the liquid acid with the second concentration collected in the second section is at least partially withdrawn as product.

By separating the gas purification sump into two sections it is possible to withdraw the product acid from one section and to use the acid collected in the other section as circulating acid. A separate pump tank for the circulating acid is not required.

Preferably, the concentration adjustment is already performed within the gas purification sump thereby avoiding a separate collecting tank.

More preferably, the concentration is adjusted with water, e.g. deionized water. It, however, is also possible to use acid for concentration adjustment, e.g. acid cross flow from a drying tower.

In a preferred option of the invention the liquid level in the two sump sections is controlled such that there is no mixture between the liquids in both sections.

Alternatively, it is possible to have an overflow of liquid from the second section where the acid concentration is different compared to the concentration of the acid into the first section.

In a particularly preferred embodiment, the second section, from which the product acid is withdrawn, is designed such that the volume of down coming liquid entering the second section is greater than the amount of product acid withdrawn from the gas purification so that there always is an overflow into the first section, from which the circulating acid is withdrawn.

The gas can be passed through the gas purification in both co-current flow as well as in counter-current flow with regard to the down coming acid. The counter-current version is preferred, since a bigger concentration gradient is obtained throughout the height of the tower, which results in a more efficient acid concentration adjustment by the gas.

Preferably, the gas comprises $SO_3$. More preferably, the $SO_3$-containing gas in step (ii) has a volume fraction of at least 5 to 35 wt-% $SO_3$. Other possible components are sulfur dioxide ($SO_2$), oxygen ($O_2$), nitrogen ($N_2$), carbon dioxide ($CO_2$) and a number of minor other components.

In another embodiment, the gas may comprise sulfur dioxide ($SO_2$). Preferably, exhaust gas containing sulfur dioxide from the overall process for the production of liquid acid may be recycled to the gas purification. Thereby, the overall sulfur dioxide emission can be reduced.

The process of the invention can principally be carried out with and produce any acid of any concentration. Preferably, the liquid acid is sulfuric acid or oleum.

For sulfuric acid ($H_2SO_4$) the second concentration of $H_2SO_4$ preferably is at least 93 wt-%, more preferably at least 99 wt-%. It is further preferred that the $H_2SO_4$ concentration in step (i) is 98-99 wt-%.

For oleum ($H_2S_2O_7$) the second concentration of free sulfur trioxide ($SO_3$) preferably is at least 20 wt-%, more preferably at least 40 wt-%, while the maximum achievable concentration of free $SO_3$ is depending on both the $SO_3$ concentration in the gas in step (ii) and the temperature of the liquid, or more specifically the partial pressure of $SO_3$ over oleum, which is dependent on the temperature.

It is further preferred that the concentration of free $SO_3$ in step (i) is about 1-2 wt-% higher than the preferred minimum concentration of $SO_3$. A typical minimum concentration is 33-40 wt-%, preferred is a concentration of 36 wt-%.

In a preferred embodiment, the gas purification is an absorber, preferably an absorber of a sulfuric acid plant. The process for the production of liquid acid with a certain minimum concentration comprises the steps of:
  (i) feeding liquid acid with a concentration which is lower than the minimum concentration into an absorber tower;
  (ii) passing a sulfur trioxide ($SO_3$) containing gas through the absorber tower such that the sulfur trioxide is at least partially absorbed in the liquid acid to increase the concentration of the liquid acid to at least the minimum concentration;
  (iii) withdrawing the acid from the absorber sump,
  wherein the absorber sump is divided by a partition wall into a first and a second section, wherein the liquid acid collected in the first section is diluted to a concentration which is less than the minimum concentration and then at least partially recirculated to step (i), and wherein the liquid acid from the second section is at least partially withdrawn as product.

In another preferred embodiment, the gas purification is a drying tower, preferably a drying tower of a sulfuric acid plant. So, the present invention also provides a process for the production of liquid acid with a certain maximum concentration inside a drying tower, comprising the steps of:
  (i) feeding liquid acid with a concentration which is higher than the product (maximum) concentration into an absorber;
  (ii) passing water containing gas through a drying tower such that the water is at least partially absorbed in the liquid acid to reduce the concentration of the liquid acid to less than the maximum concentration;
  (iii) withdrawing the liquid acid from the drying tower sump,
  wherein the drying tower sump is divided by a partition wall into a first and a second section, wherein the liquid acid collected in the first section is concentrated to a concentration which is more than the product (maximum) concentration and then at least partially recirculated to step (i), and wherein the liquid acid from the second section is at least partially withdrawn as product.

In particular, the concentration of the liquid acid inside the drying tower sulfuric acid has to be set to a concentration of more than 92 wt-%, preferably 93 to 94 wt-%.

The invention further comprises a plant for the production of liquid acid, which is suitable for carrying out the method according to any of claims 1 to 8. The plant in particular comprises a gas purifier with a supply system for liquid acid, a gas inlet, and a gas purifier sump with an acid outlet, wherein the gas purifier sump is divided by a partition wall into a first section and a second section, wherein separate outlets are provided for the first and second sections, respectively, and wherein the first section is connected with the acid supply system.

In an embodiment of the invention, an inlet for an adjusting liquid is provided in the first section, wherein a lance is provided for introducing the adjusting liquid into the first section. Concentration adjustment, however, may also take place after the acid has been withdrawn from the first section.

The partition wall inside the gas purifier preferably is made of brick or carbon steel or stainless steel with or without brick lining.

If the top level of the partition wall is located below the lowest point of the gas inlet it can be ensured that the gas introduced into the gas purifier does not pass through the acid collected in the gas purifier sump so that no additional absorption takes place in this section. Furthermore, an introduction of acid into the gas inlet and corrosion of said gas inlet can be avoided.

It is preferred that an overflow is provided between the first and second sections, in particular from the second to the first section.

Preferably, a level control is provided in the first and/or second section to avoid any acid exchange between the sections. Most preferred is a control from the to the second section.

In a particular preferred embodiment, the gas purifier is an absorber, in particular a packed bed absorber, wherein the liquid acid is introduced through an irrigation system and trickles through a packed bed. The packed bed increases the acid surface and thereby promotes absorption.

In another preferred embodiment, the gas purifier is a drying tower, in particular a packed bed drying tower.

In the above mentioned preferred embodiments, the invention also comprises a plant for the production of liquid acid comprising a drying tower and/or an absorber with a supply system for liquid acid, a gas inlet for a gas and a sump with an acid outlet, wherein the sump is divided by a partition wall into a first section and a second section, wherein separate outlets are provided for the first and second sections, respectively, and wherein the first section is connected with the acid supply system.

The inventive processes and the inventive plants may achieve the production of sulfuric acid or oleum of a certain minimum and/or maximum concentration in an energy and resource-effective manner. The separation of the absorber sump and/or drying tower sump allows the production of different concentrations of sulfuric acid or oleum fractions in a single plant.

Further embodiments, advantages and applications of the invention will also be apparent from the following description of preferred embodiments and the drawings. All features described and/or illustrated, alone or in any combination form the subject matter of the invention, irrespective of their inclusion in the claims or their back reference.

Figure 1:
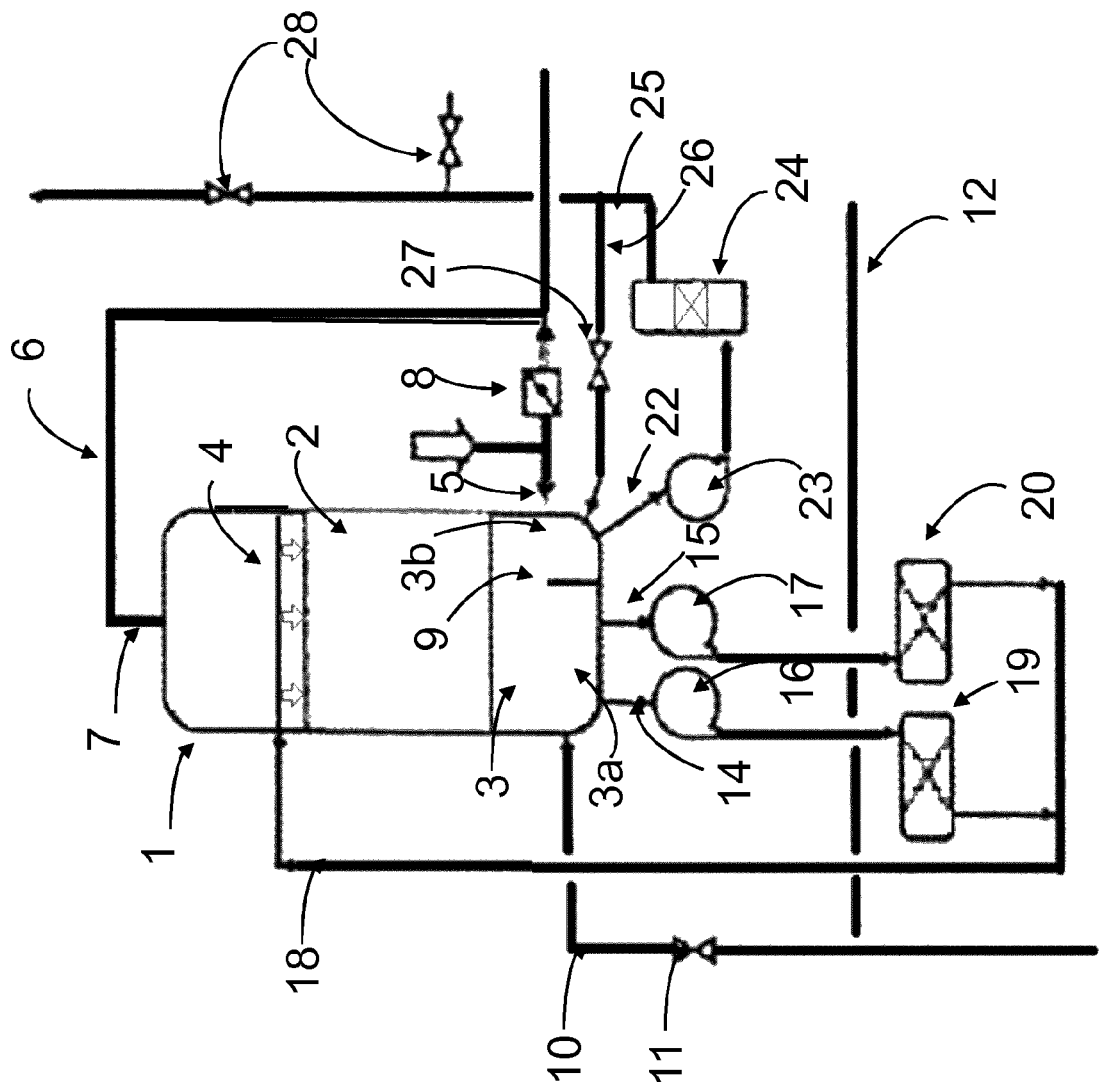
FIG. 1 shows schematically a suitable absorber for carrying out the method of the invention for the production of oleum with a certain maximum concentration.
Figure 2:
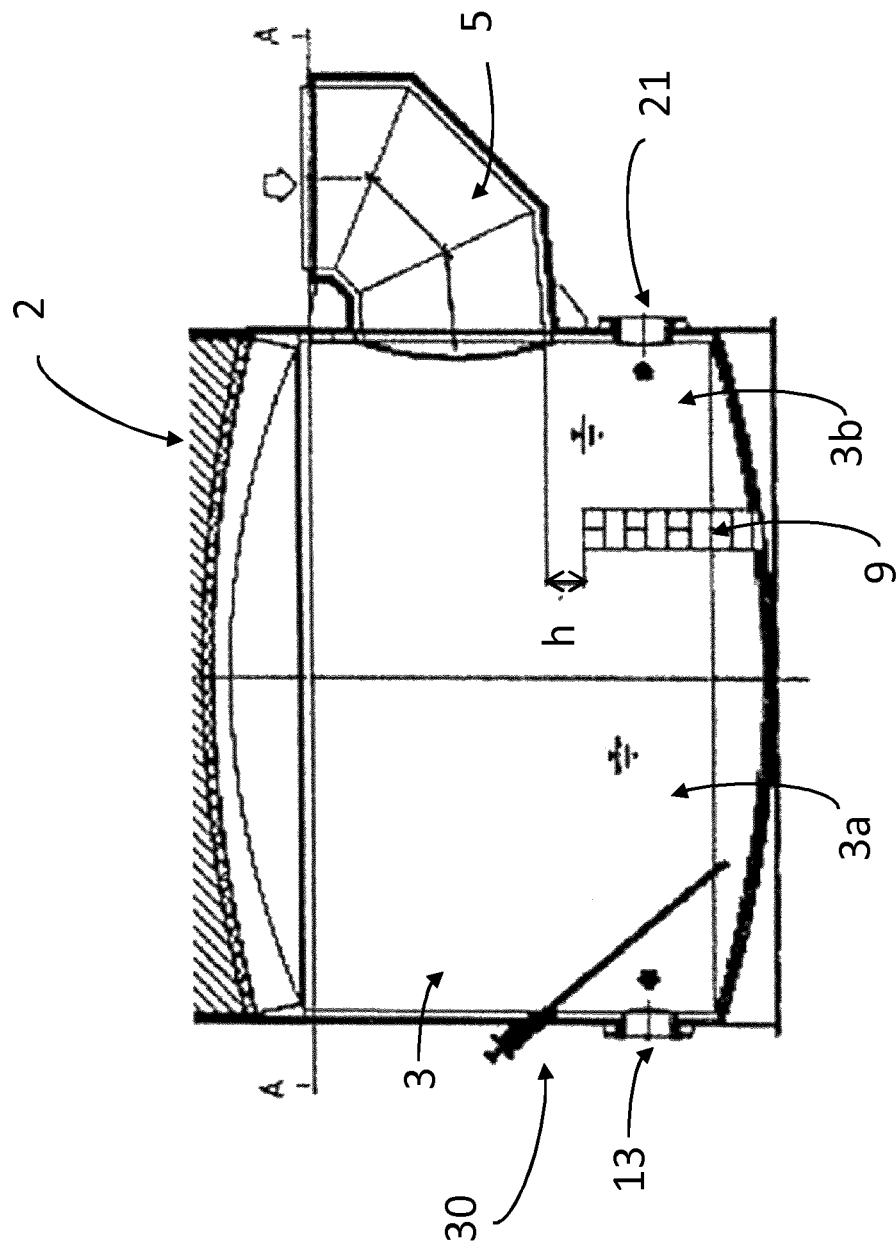
FIG. 2 shows the lower section of an absorber or a drying tower used in the process and plant of the invention.
Figure 3:
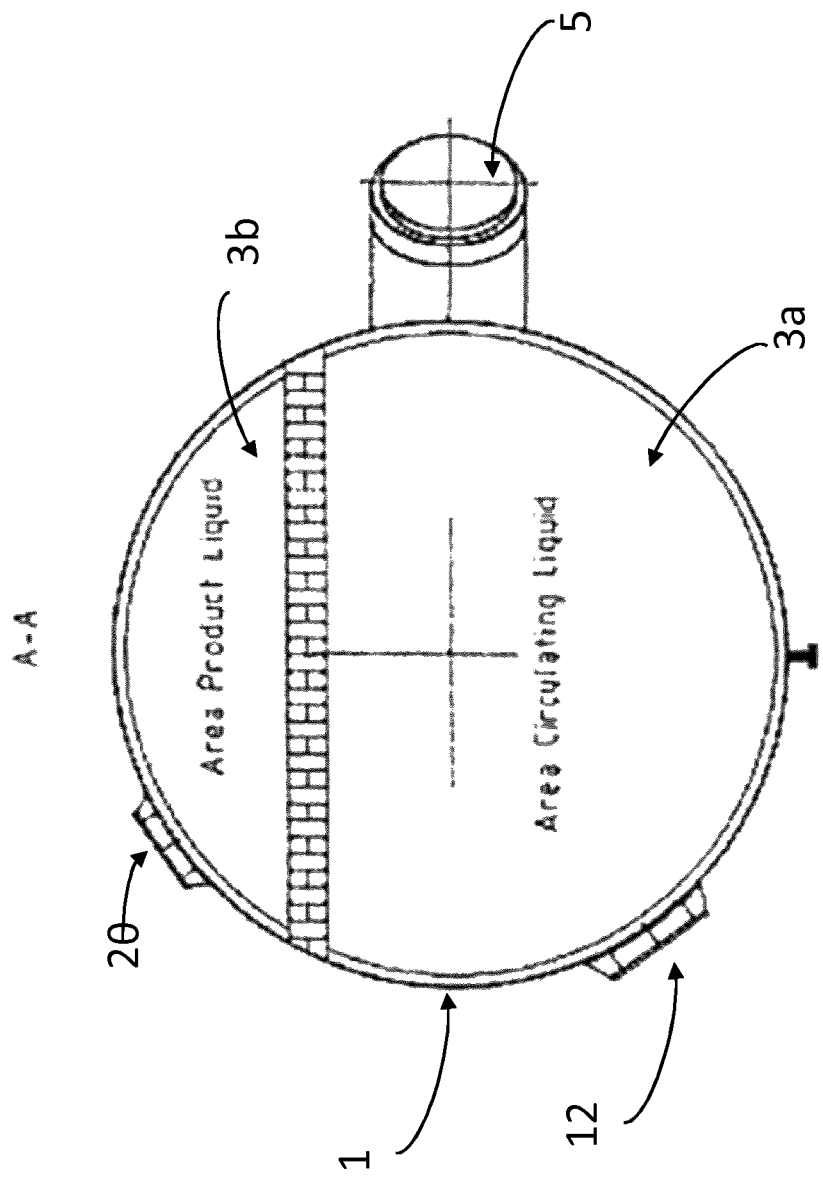
FIG. 3 is a schematic cross section along line A-A in FIG. 2.

The invention is first illustrated by way of example with reference to the FIGS. 1 to 3.

In FIG. 1 an absorber 1 is depicted as a packed bed absorption tower comprising a packed bed 2 located above an absorber sump 3. An acid supply system 4 in the form of an irrigation system known in the art is provided above the packed bed 2 to introduce liquid acid, in particular sulfuric acid or oleum, that then trickles through the packed bed 2 and is collected in the absorber sump 3. A gas inlet 5 is provided below the packed bed 2 to introduce a gas containing sulfur trioxide ($SO_3$) and possibly containing sulfur dioxide ($SO_2$), which then flows upwardly in counter current flow through the packed bed 2. By the contact with the down coming sulfuric acid sulfur trioxide is absorbed in the acid thereby increasing the acid concentration.

In the case of oleum production, non-absorbed sulfur trioxide may be recycled to the gas inlet 5 through recycling line 6. Alternatively, the gas containing sulfur trioxide and possibly sulfur dioxide may be bypassed via line 6 to the gas outlet 7 and the amount of gas bypassed can be adjusted via gas valve 8.

The absorber sump 3 is divided into a first section 3a and a second section 3b by a partition wall 9.

A diluting medium, in particular water or dilution acid, is introduced into the first section 3a through line 10 to reduce the acid concentration in said section 3a to a desired value. The amount of diluting medium may be adjusted by valve 11. In case of the diluting medium being sulfuric acid, the dilution acid may be removed from a drying tower (not shown) and introduced to the absorber 1 via lines 12 and 10. The liquid acid is withdrawn from the first section 3a through outlet nozzle 13 (FIG. 2) and line 14, 15 via pumps 16, 17 and then recycled to the acid supply system 4 via recycling line 18. The temperature of the acid may be adjusted by heat exchangers (coolers) 19, 20 prior to the recycling to the absorber 1.

Obviously, it is possible to use only one outlet nozzle 13, line 14, pump 16 and heat exchanger 19, respectively. Dilution may also be performed outside the absorber sump 3 after withdrawing the acid from the first section 3a.

Figure 4:
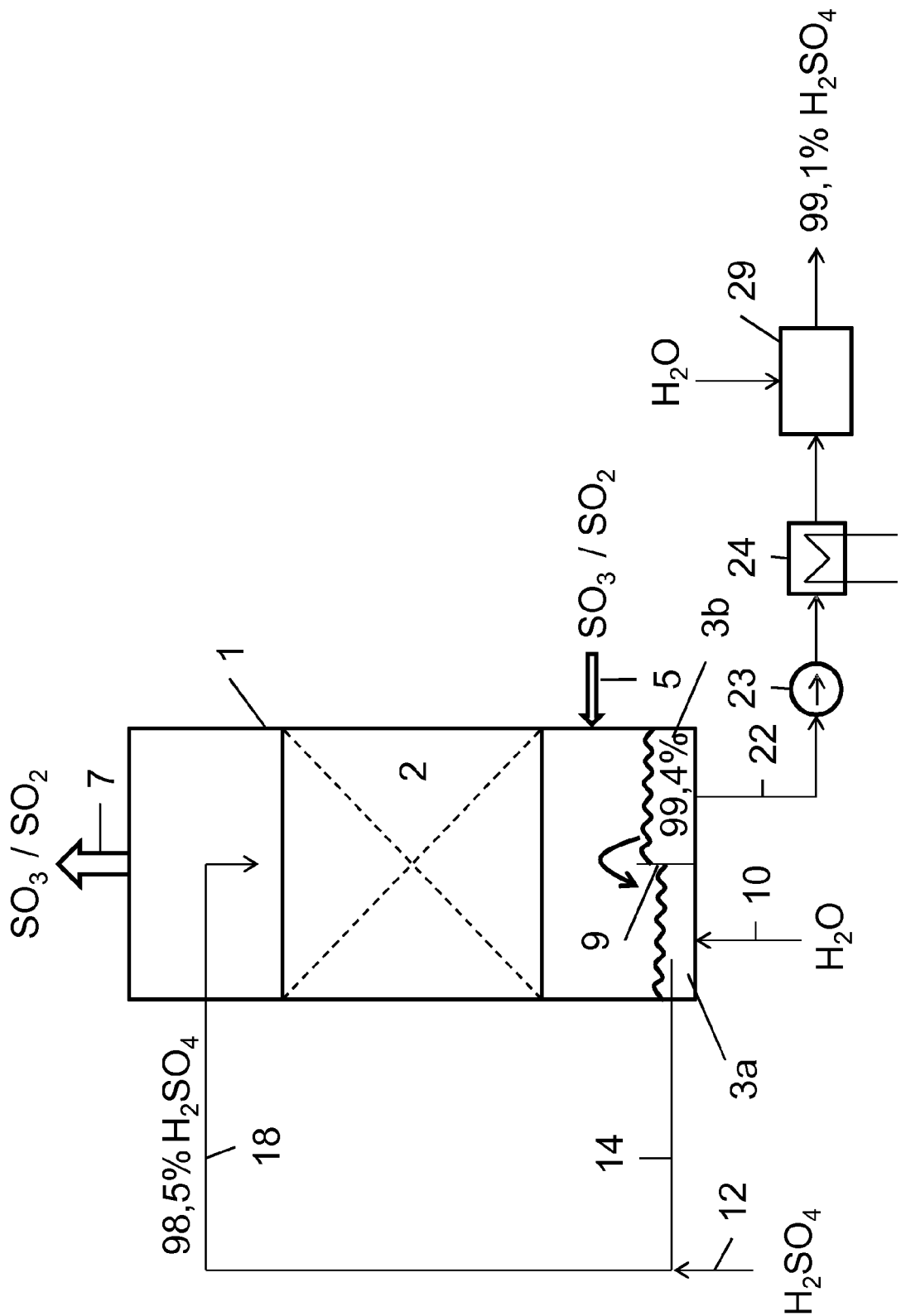
FIG. 4 shows schematically the method of the invention for the production of sulfuric acid in an absorber.
Figure 5:
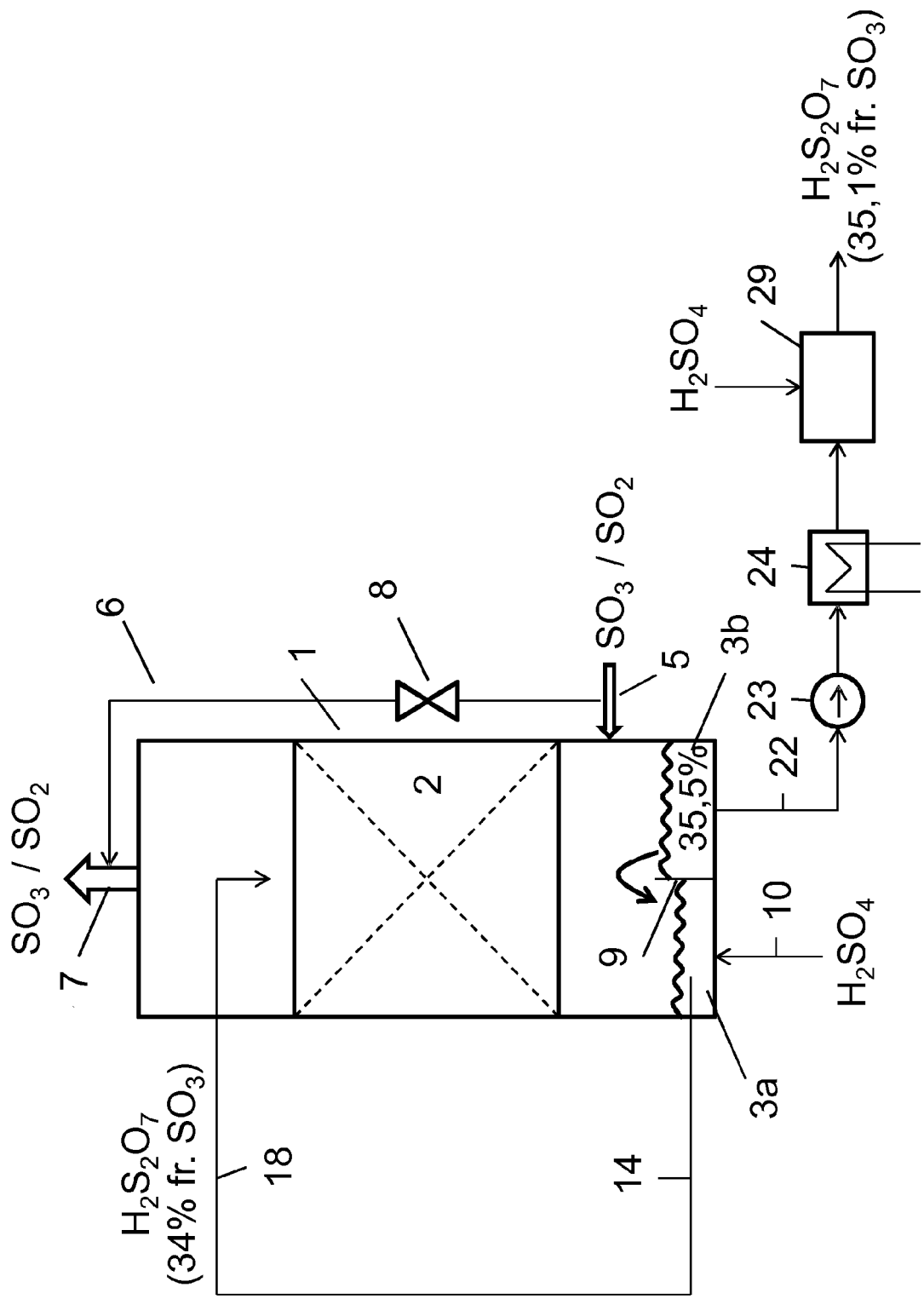
FIG. 5 shows schematically the method of the invention for the production of oleum in an absorber.

From the second section 3b of the absorber sump 3, the acid/oleum is withdrawn as product acid/oleum through an outlet nozzle 21 (FIG. 2) and line 22 via pump 23 and heat exchanger (cooler) 24 and then withdrawn through line 25 and/or partially recycled to the second section 3b through line 26. The amount of acid/oleum recycled can be controlled via valve 27, wherein the amount of product acid/oleum withdrawn from the process is controlled via valves 28. If necessary, the concentration of the product acid/oleum may be adapted to the desired value by introducing a dilution medium such as water or dilution acid, which is shown in FIGS. 4 and 5, wherein water (FIG. 4) or acid (FIG. 5) is introduced to tank 29, respectively.

FIG. 2 shows the lower part of the absorber 1 with the packed bed 2 (partially) and the absorber sump 3. As can be seen in FIG. 2 the partition wall 9 is made of brick but may also consist of other suitable materials such as carbon steel, stainless steel, etc.

In case of the depicted counter-current flow setup the gas inlet 5 for the $SO_3$-containing gas is located below the packed bed 2 and its lowest point is at a predetermined distance h, preferably 100-300 mm, above the top level of the partition wall 9 to ensure that the $SO_3$-containing gas does not flow through the product acid in the second section 3b.

In the first section 3a of the absorber sump 3 the dilution medium is introduced preferably through a lance 30 directly into the first section 3a. Other means of introducing the dilution medium can be envisaged, such as a nozzle above the acid level in the first section 3a. The diluted acid is withdrawn for the first section 3a through nozzle 13. The acid level in the first section 3a is level controlled to ensure that no diluted acid enters into the second section across the partition wall 9.

The liquid level in the second section 3b is defined by the height of the partition wall and the relation between the acid trickling into the first section 3a from the packed bed 2 and the acid flow withdrawn through outlet nozzle 21. While the acid level in the second section 3b may be level controlled similar to the first section 3a, it is preferred that the second section 3b (product section) is designed such the amount of down coming liquid is greater than the production rate, i.e. the acid flow withdrawn through nozzle 21. Thereby there is always an overflow of acid from the second section 3b into the first section 3a. The overflow may be over the top level of the partition wall 9 or through a specific overflow conduit (not shown). The calculation for the minimum area of the second section 3b (product section) is based on:

desired production rate ($m^3$/h) divided by irrigation rate ($m^3/m^2$h)

Figure 6:
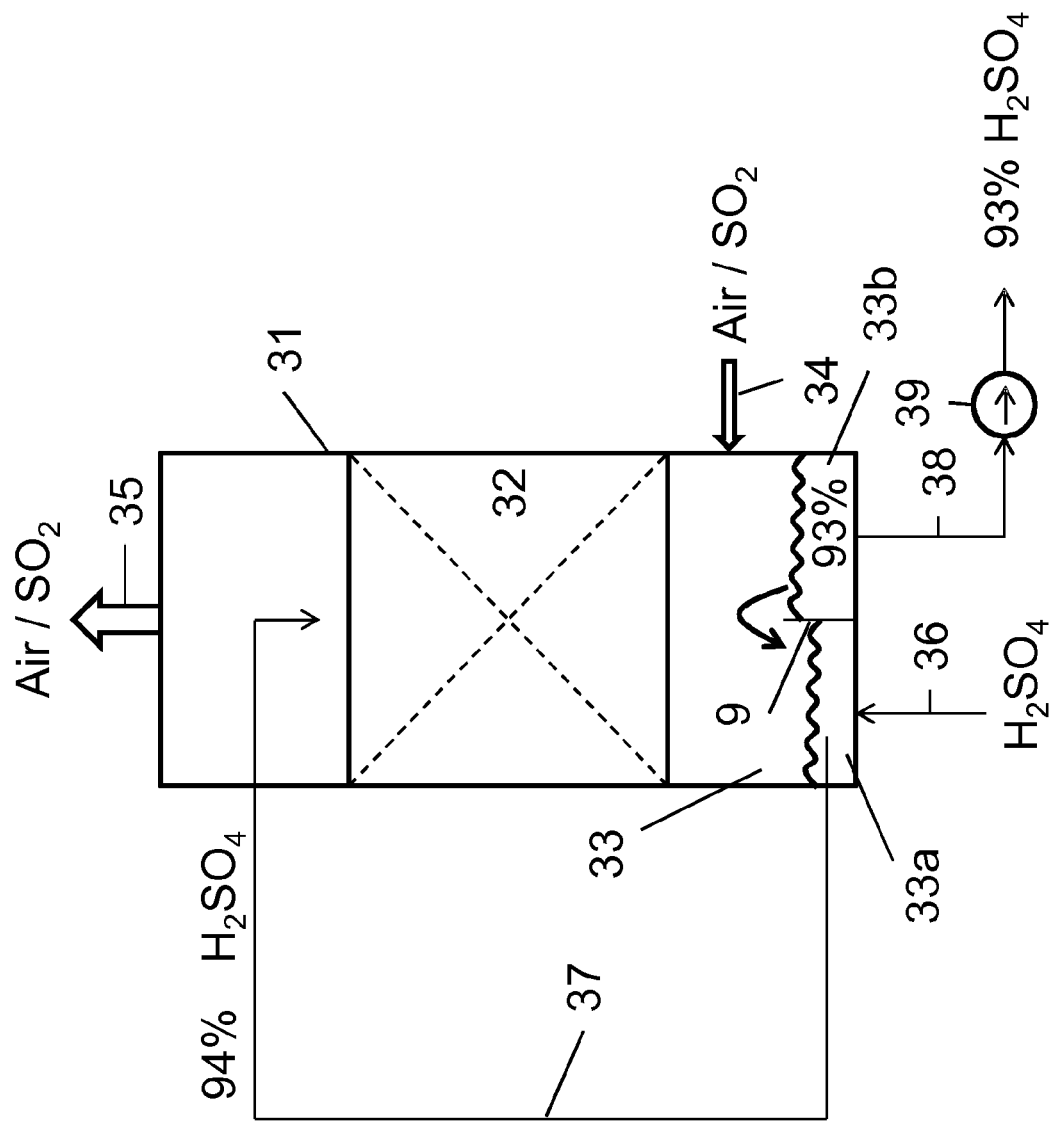
FIG. 6 shows schematically the method of the invention for the production of sulfuric acid with a certain minimum concentration in a drying tower.

In accordance with the invention, the sulfuric acid production inside the drying tower 31 is schematically shown in FIG. 6. The drying tower 31 is depicted as a packed bed drying tower comprising a packed bed 32 located above an drying tower sump 33.

An acid supply system (not shown) known in the art is provided above the packed bed 32 to introduce liquid acid, in particular sulfuric acid or oleum, that then trickles through the packed bed 32 and is collected in the drying tower sump 33. A gas inlet 34 is provided below the packed bed 32 to introduce a gas containing water, e.g. air, and possibly containing oxygen and sulfur dioxide ($SO_2$), which then flows upwardly in counter current flow through the packed bed 32 and is removed via gas outlet 35. Water is absorbed by the contact with the down coming sulfuric acid thereby reducing the acid concentration.

The drying tower sump 33 is divided by partition wall 9 into a first section 33a and a second section 33b. Diluted acid in the first section 33a is concentrated by introduction of highly concentrated sulfuric acid via line 36. The concentrated acid is recycled via line 37 to the top of the drying tower. From the second section 33b diluted acid is withdrawn via line 38 and pump 39.

EXAMPLE 1 (PRODUCTION OF SULFURIC ACID IN THE ABSORBER)

As shown in FIG. 4, liquid sulfuric acid ($H_2SO_4$) at a temperature of 70 to 90° C., preferred 80° C. is directed from the absorber 1 plus cross flow acid from the drying tower via conduit 12, wherein the absorber 1 is made from stainless steel or brick lined carbon steel. Apart from having the specified concentration and temperature, the liquid $H_2SO_4$ is virtually free of contaminating compounds like sulfur dioxide ($SO_2$) and nitrous oxides ($NO_x$). The liquid $H_2SO_4$ is injected in a volume regarding irrigation rates between 10 to 40 $m^3/m^2$ h and runs down over a packed bed 2 made of ceramic saddles into the absorber sump 3 and is simultaneously being flowed through with a sulfur trioxide ($SO_3$) containing gas in counter-current flow via gas inlet 5 into the absorber 1. The inlet for the $SO_3$-containing gas is located below the packed bed 2 and above the top level of the partition wall 9. The $SO_3$-containing gas enters the absorber at a temperature of 160 to 240° C., a volume fraction of $SO_3$ of 5 to 35 wt-%. Due to the reaction of $SO_3$ with the water contained in the sulfuric acid, the concentration of the sulfuric acid is increased to 99.4 wt-%. Any unabsorbed $SO_3$ leaves the absorber 1 through line 7 located at the top of the absorber 1 and can optionally be recycled. Typically, the volume fraction of $SO_3$ is reduced to far less than 1 wt-% upon exiting the absorber 1.

The sulfuric acid with a concentration of 99.4 wt-% and a temperature of 90 to 140° C. collects in the sump 3 of the absorber 1. The sump 3 is divided by partition wall 9 made of acid resistant bricks, carbon steel or stainless steel into two sections 3a, 3b. The liquid level in the first section 3a is controlled so that there is no overflow of liquid from the first section 3a into the second section 3b. Undiluted sulfuric acid from the second section 3b is withdrawn through line 22 and a pump 23 and is fed first into a heat exchanger 24 where it is cooled to a temperature of 70 to 90° C. and then into an optional diluter 29. In the diluter 29 the concentration of the sulfuric acid is adjusted with water to the desired final concentration of 99.1 wt-%, which then is withdrawn as end product The sulfuric acid in the first section 3a of the absorber sump 3 is diluted to a concentration of 98.5 wt-% by supplying water through line 10 while preferably the concentration of the sulfuric acid is constantly monitored. The diluted sulfuric acid is removed from the absorber 1 through line 14 and at least partially recycled to the acid supply system 4 of the absorber 1 via line 18.

EXAMPLE 2 (PRODUCTION OF OLEUM)

As shown in FIG. 5, liquid oleum ($H_2S_2O_7$) at a concentration of 34 wt-% of free $SO_3$ and a temperature of 40 to 70° C.° C., preferably 50° C., is directed in a closed loop into the head of an absorber 1 made from carbon steel or stainless steel or brick lined carbon steel. The liquid oleum is fed to the top of the tower and runs down over a packed bed 2 made of ceramic packings, e.g. Intalox saddles, into the absorber sump 3 and is simultaneously being contacted with a sulfur trioxide ($SO_3$) containing gas in counter-current flow which is passed via gas inlet 5 into the absorber 1. The inlet for the $SO_3$-containing gas is located below the packed bed 2 and above the top level of the partition wall 9. The $SO_3$-containing gas enters the absorber at a temperature of 160 to 240° C. and a volume fraction of 5 to 35 wt-%. Due to the reaction of $SO_3$ with the acid contained in the oleum, the concentration of the free $SO_3$ in the oleum is increased to 35.5 wt-%. Any unabsorbed $SO_3$ leaves the absorber 1 through line 7 located at the top of the absorber 1 and can optionally be recycled.

The oleum with a concentration of 35.5 wt-% of free $SO_3$ and an increased temperature collects in the sump 3 of the absorber 1. The sump 3 is divided by partition wall 9 into two sections 3a, 3b. The liquid level in the first section 3a is controlled so that there is no overflow of liquid from the first section 3a into the second section 3b. Undiluted oleum from the second section 3b is withdrawn through line 22 and a pump 23 and is fed first into a heat exchanger 24 and then into an optional diluter 29. In the diluter 29 the concentration of the oleum is adjusted with acid to the desired final concentration of 35.1 wt-% of free $SO_3$ and withdrawn as an end product.

The oleum in the first section 3a of the absorber sump 3 is diluted to a concentration of 34 wt-% of free $SO_3$ by supplying sulfuric acid having a concentration of 98 to 99 wt-% through line 10 while preferably the concentration of the sulfuric acid is constantly monitored and controlled. The diluted oleum is removed from the absorber 1 through line 14 and at least partially recycled to the top of the absorber 1.

EXAMPLE 3 (PRODUCTION OF SULFURIC ACID IN THE DRYING TOWER)

As shown in FIG. 6, liquid sulfuric acid ($H_2SO_4$) at a concentration of 94 wt-% and a temperature of 70 to 90° C. is directed from the drying tower 31, which is made from stainless steel or brick lined carbon steel and injected in a volume regarding irrigation rates between 10 to 40 $m^3/m^2$ h and runs down over a packed bed 32 made of ceramic saddles into the drying tower sump 33. At the same time air as a water containing gas, is introduced via gas inlet 34 into the drying tower 31. The inlet for the gas is located below the packed bed 32 and above the top level of the partition wall 9. The water containing gas enters the drying tower at a temperature of 5 to 40° C. Due to the hygroscopic properties of sulfuric acid the water contained in the air is absorbed in the acid and the concentration of the sulfuric acid is reduced to 93 wt-%. Dried air with a water content of less than 50 mg ($H_2O$)/$Nm^3$ leaves the drying tower 31 through line 35 located at the top of the drying tower 31 and may be used for elemental sulfur combustion. In a further embodiment, exhaust gas from the overall sulfuric acid production process is recycled to the drying tower, since this exhaust gas contains unreacted sulfuric dioxide.

The sulfuric acid with a concentration of 93 wt-% and a temperature of 80 to 100° C. is collected in the sump 33 of the drying tower 31. The sump 33 is divided by partition wall 9 made of acid resistant bricks, carbon steel or stainless steel into two sections 33a, 33b. The liquid level in the first section 33a is controlled so there is no overflow of liquid from the first section 33a into the second section 33b.

Sulfuric acid from the second section 33b is withdrawn through line 38 and a pump 39 is withdrawn as end product.

The sulfuric acid in the first section 3a of the absorber sump 3 is concentrated to a concentration of 94 wt-% by supplying sulfuric acid with a concentration of at least 98 wt-% through line 36 while preferably the concentration of the sulfuric acid is constantly monitored. The concentrated sulfuric acid is removed from the drying tower 31 through line 37 and at least partially recycled to the top of the drying tower 31.

LIST OF REFERENCE NUMERALS 1 absorber
2 packed bed
3 absorber sump
3a first section
3b second section
4 acid supply system
5 gas inlet (for $SO_3$-containing gas)
6 recycling line
7 gas outlet
8 gas valve
9 partition wall
10 line
11 valve
12 cross flow line
13 outlet nozzle
14, 15 acid effluent line
16, 17 pump
18 recycling line
19, 20 heat exchanger
21 outlet nozzle
22 line
23 pump
24 heat exchanger
25 line
26 line
27, 28 valves
29 diluter
30 lance
31 drying tower
32 packed bed of the drying tower
33 drying tower sump
34 gas inlet
35 gas outlet
36 line
37 recycling line
38 line
39 pump
h distance top level of partition wall 9 to gas inlet 5

The invention claimed is:

1. A process for the production of sulfuric acid, comprising the steps of:
   (i) feeding liquid acid with a first concentration into a gas purification in form of a packed bed absorber or a packed bed drying tower;
   (ii) passing a gas through the gas purification such that a second concentration of the liquid acid is reached;
   (iii) withdrawing the liquid acid from the sump of the gas purification, wherein the gas purification sump is divided by a partition wall into a first and a second section,
   wherein
   the concentration of the liquid acid collected in the first section is adjusted to the first concentration,
   the liquid acid with the first concentration from the first section is at least partially fed back into step (i), and
   the liquid acid with the second concentration collected in the second section is at least partially withdrawn as product, and the concentration of the liquid acid in the first section is adjusted with acid or water.

2. The process according to claim 1, wherein the gas in step (ii) is conducted through the gas purification in counter-flow or in co-current flow to the liquid acid.

3. The process according to claim 1, wherein the first and/or the second section is level controlled.

4. The process according to claim 1, wherein the volume of down coming acid introduced into the second section is greater than the amount of product withdrawn from the second section.

5. The process according to claim 1, wherein the liquid acid is sulfuric acid or oleum and that the gas comprises $SO_3$.

6. A plant for the production of sulfuric acid, by a process according to claim 1, comprising a gas purifier in form of a packed bed absorber or a packed bed drying tower containing a supply system for liquid acid, a gas inlet, and a gas purifier sump, wherein the gas purifier sump is divided by a partition wall into a first section and a second section, that separate outlets are provided for the first and second sections, respectively, and that the first section is connected with the acid supply system via a recycling line,
wherein an inlet for an adjusting liquid is provided in the first section.

7. The plant according to claim 6, wherein a lance is provided for introducing the adjusting liquid into the first section.

8. The plant according to claim 6, wherein the partition wall is made of bricks or carbon steel or stainless steel.

9. The plant according to claim 6, wherein the top level of the partition wall is located below the lowest point of the gas inlet.

10. The plant according to claim 6, wherein an overflow is provided between the first and second sections.

11. The plant according to claim 6, wherein a level control is provided in the first and/or second section.

* * * * *